US012597034B2

(12) United States Patent  
Vimal et al.

(10) Patent No.: US 12,597,034 B2  
(45) Date of Patent: Apr. 7, 2026

(54) FRAUD DETECTION METHODS AND SYSTEMS BASED ON EVOLUTION-BASED BLACK-BOX ATTACK MODELS

(71) Applicant: Mastercard International Incorporated, New York, NY (US)

(72) Inventors: Siddharth Vimal, Chandigarh (IN); Gaurav Dhama, Gurgaon (IN); Kanishka Kayathwal, Kota (IN); Nishant Kumar, Jamshedpur (IN)

(73) Assignee: Mastercard International Incorporated, Purchase, NY (US)

( * ) Notice: Subject to any disclaimer, the term of this patent is extended or adjusted under 35 U.S.C. 154(b) by 115 days.

(21) Appl. No.: 18/078,895

(22) Filed: Dec. 9, 2022

(65) Prior Publication Data

US 2023/0186311 A1 Jun. 15, 2023

(30) Foreign Application Priority Data

Dec. 10, 2021 (IN) .............................. 202141057489

(51) Int. Cl.  
*G06Q 20/40* (2012.01)

(52) U.S. Cl.  
CPC ................................ *G06Q 20/4016* (2013.01)

(58) Field of Classification Search  
CPC .................................................. G06Q 20/4016  
See application file for complete search history.

(56) References Cited

U.S. PATENT DOCUMENTS 10,200,394 B2 2/2019 Grigoryan et al.  
10,380,703 B2 8/2019 Chrapko et al.  
(Continued)

FOREIGN PATENT DOCUMENTS

CA 3066775 * 4/2019 ............. G16B 20/00  
CA 3154393 * 5/2021 ............. G06F 21/44  
CA 3131255 * 8/2022 ............. H04W 12/35

OTHER PUBLICATIONS

Abakarim, et al., in "An Efficient Real Time Model for Credit Card Fraud Detection Based on Deep Learning," from SITA '18, 2018 (Year: 2018).*

(Continued)

*Primary Examiner* — Mike Anderson  
*Assistant Examiner* — Brandon M Duck  
(74) *Attorney, Agent, or Firm* — Pramudji Law Group PLLC; Ari Pramudji

(57) ABSTRACT

Various embodiments relate to methods and systems for generating adversarial samples. The method performed by a server system includes accessing a set of payment transaction samples from transaction database. The method includes initializing a plurality of encoders, weights of each of the plurality of encoders being randomly initialized. Further, the method includes computing a set of initial adversarial samples using the plurality of encoders based on the set of payment transaction samples. Further, the method includes optimizing the plurality of encoders to generate a plurality of evolved encoders. Further, method includes computing a plurality of fitness scores for the plurality of evolved encoders. Further, the method includes determining a top evolved encoder from the plurality of evolved encoders based on the plurality of fitness scores. Further, the method includes generating a set of final adversarial samples using the top evolved encoder based on the set of payment transaction samples.

18 Claims, 11 Drawing Sheets

(56) References Cited

U.S. PATENT DOCUMENTS

| | | | |
|---|---|---|---|
| 11,132,686 | B2 | 9/2021 | Nightengale et al. |
| 2012/0323717 | A1 | 12/2012 | Kirsch |
| 2019/0114682 | A1* | 4/2019 | Bishop .................. G06F 40/117 |
| 2022/0058273 | A1* | 2/2022 | Rathmore ............... G06F 21/57 |
| 2022/0156376 | A1* | 5/2022 | Santos .................. G06F 21/554 |
| 2022/0366421 | A1 | 11/2022 | Wang et al. |

OTHER PUBLICATIONS

PCT/US2025/034984 International Search Report and Written Opinion dated Oct. 30, 2025, pp. 1-11.

* cited by examiner

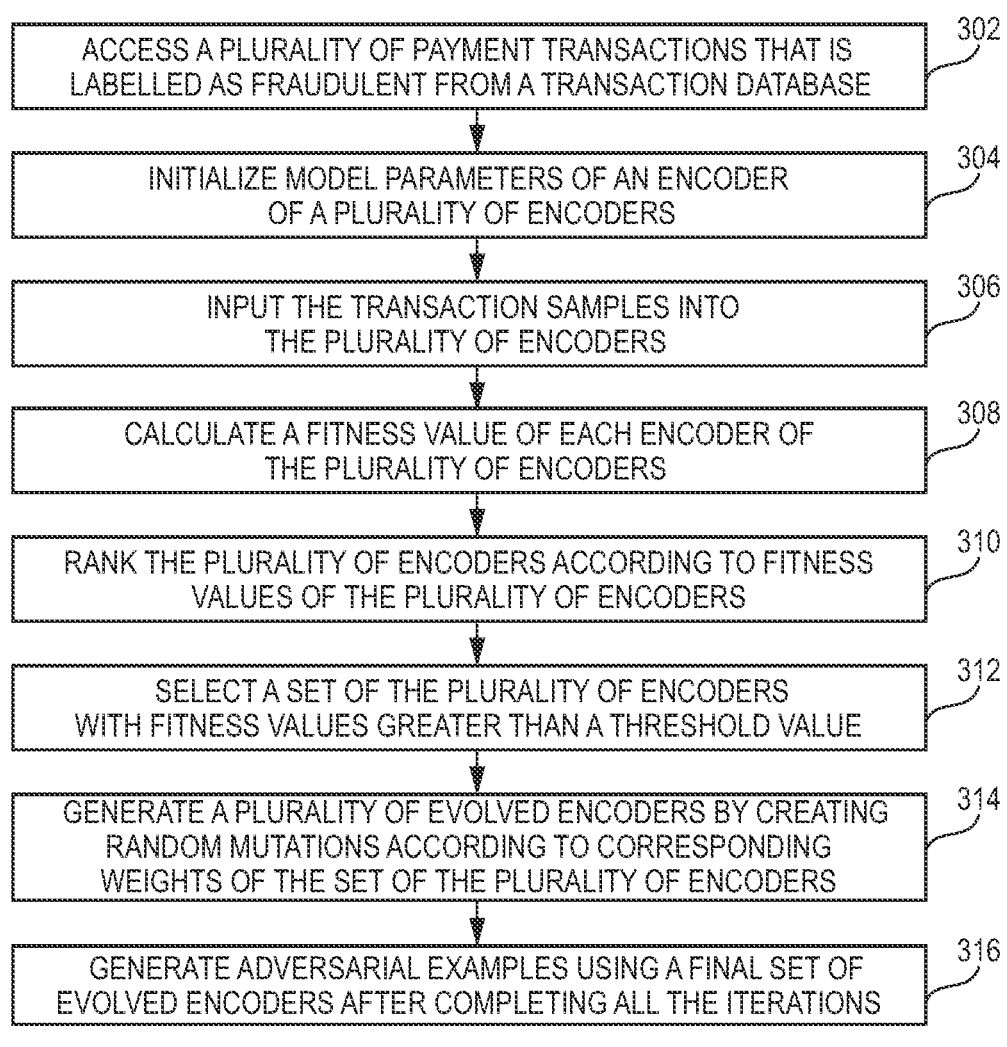

ACCESS A PLURALITY OF PAYMENT TRANSACTIONS THAT IS
LABELLED AS FRAUDULENT FROM A TRANSACTION DATABASE        302

INITIALIZE MODEL PARAMETERS OF AN ENCODER
OF A PLURALITY OF ENCODERS        304

INPUT THE TRANSACTION SAMPLES INTO
THE PLURALITY OF ENCODERS        306

CALCULATE A FITNESS VALUE OF EACH ENCODER OF
THE PLURALITY OF ENCODERS        308

RANK THE PLURALITY OF ENCODERS ACCORDING TO FITNESS
VALUES OF THE PLURALITY OF ENCODERS        310

SELECT A SET OF THE PLURALITY OF ENCODERS
WITH FITNESS VALUES GREATER THAN A THRESHOLD VALUE        312

GENERATE A PLURALITY OF EVOLVED ENCODERS BY CREATING
RANDOM MUTATIONS ACCORDING TO CORRESPONDING
WEIGHTS OF THE SET OF THE PLURALITY OF ENCODERS        314

GENERATE ADVERSARIAL EXAMPLES USING A FINAL SET OF
EVOLVED ENCODERS AFTER COMPLETING ALL THE ITERATIONS        316

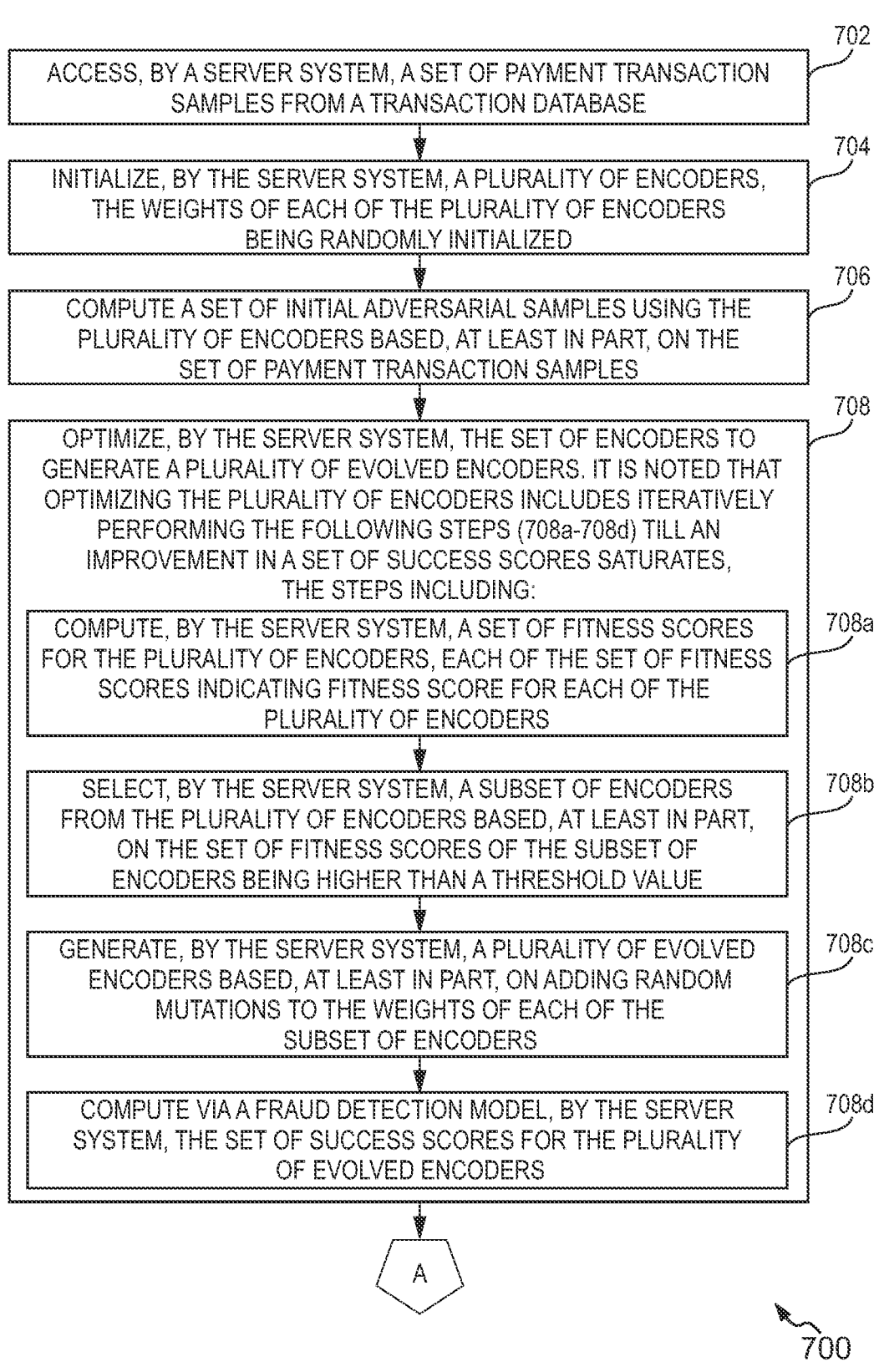

702

ACCESS, BY A SERVER SYSTEM, A SET OF PAYMENT TRANSACTION SAMPLES FROM A TRANSACTION DATABASE

704

INITIALIZE, BY THE SERVER SYSTEM, A PLURALITY OF ENCODERS, THE WEIGHTS OF EACH OF THE PLURALITY OF ENCODERS BEING RANDOMLY INITIALIZED

706

COMPUTE A SET OF INITIAL ADVERSARIAL SAMPLES USING THE PLURALITY OF ENCODERS BASED, AT LEAST IN PART, ON THE SET OF PAYMENT TRANSACTION SAMPLES

708

OPTIMIZE, BY THE SERVER SYSTEM, THE SET OF ENCODERS TO GENERATE A PLURALITY OF EVOLVED ENCODERS. IT IS NOTED THAT OPTIMIZING THE PLURALITY OF ENCODERS INCLUDES ITERATIVELY PERFORMING THE FOLLOWING STEPS (708a-708d) TILL AN IMPROVEMENT IN A SET OF SUCCESS SCORES SATURATES, THE STEPS INCLUDING:

708a

COMPUTE, BY THE SERVER SYSTEM, A SET OF FITNESS SCORES FOR THE PLURALITY OF ENCODERS, EACH OF THE SET OF FITNESS SCORES INDICATING FITNESS SCORE FOR EACH OF THE PLURALITY OF ENCODERS

708b

SELECT, BY THE SERVER SYSTEM, A SUBSET OF ENCODERS FROM THE PLURALITY OF ENCODERS BASED, AT LEAST IN PART, ON THE SET OF FITNESS SCORES OF THE SUBSET OF ENCODERS BEING HIGHER THAN A THRESHOLD VALUE

708c

GENERATE, BY THE SERVER SYSTEM, A PLURALITY OF EVOLVED ENCODERS BASED, AT LEAST IN PART, ON ADDING RANDOM MUTATIONS TO THE WEIGHTS OF EACH OF THE SUBSET OF ENCODERS

708d

COMPUTE VIA A FRAUD DETECTION MODEL, BY THE SERVER SYSTEM, THE SET OF SUCCESS SCORES FOR THE PLURALITY OF EVOLVED ENCODERS

DETERMINE, BY THE SERVER SYSTEM, A TOP EVOLVED ENCODER FROM THE PLURALITY OF EVOLVED ENCODERS BASED, AT LEAST IN PART, ON THE PLURALITY OF FITNESS SCORES
710

GENERATE, BY THE SERVER SYSTEM, A SET OF FINAL ADVERSARIAL SAMPLES USING THE TOP EVOLVED ENCODER BASED, AT LEAST IN PART, ON THE SET OF PAYMENT TRANSACTION SAMPLES
712

700

FRAUD DETECTION METHODS AND SYSTEMS BASED ON EVOLUTION-BASED BLACK-BOX ATTACK MODELS

TECHNICAL FIELD

The present disclosure relates to artificial intelligence and, more particularly to, electronic methods and complex processing systems for utilizing evolution-based black-box attack models to improve machine learning models (e.g., fraud detection models) with tabular input datasets.

BACKGROUND

In the current scenario, with the rise in the amount of data available and the ability to process the data, many industries are leveraging machine learning and deep learning techniques to make better decisions. Deep learning and machine learning have seen a high adoption in various real-world applications over the past few years like autonomous driving, object detection, and language translation. Due to the increased dependence on these models, it is important to address the safety and security concerns related to these models which are often overlooked. The addition of small perturbations to an original image can yield samples that are imperceptible to humans but can lead to models making incorrect predictions. These generated samples are called adversarial examples and the algorithms that find these examples are called adversarial attacks.

Most of the existing algorithms or systems revolve around unstructured data (images and text) and the generation of adversarial examples for tabular data still appears to be less explored. Since many real-life businesses use machine learning models on the tabular data, it is necessary to explore adversarial example generation for the tabular data to understand the extent of safety concerns and vulnerabilities associated with these deployed models.

Further, the banking industry is one such example that uses machine learning for a range of use cases like loan approval, credit risk assessment, and credit card fraud detection. Fraud detection is one of the biggest challenges faced by financial institutions that process payments and with the rise in the adoption of machine learning techniques in this domain, fraudsters are also finding new and more sophisticated methods to bypass these systems. It is possible for fraudsters to use adversarial attacks such as black-box attacks to fool a vulnerable fraud detection model in deployment which can potentially cause huge losses to the issuing banks.

Thus, there exists a need for technical solutions for generating black-box attack models for improving the fraud detection models.

SUMMARY

Various embodiments of the present disclosure provide methods and systems for generating adversarial samples.

In an embodiment, a computer-implemented method for generating adversarial examples is disclosed. The computer-implemented method performed by a server system includes accessing a set of payment transaction samples from a transaction database. The method includes initializing a plurality of encoders, weights of each of the plurality of encoders being randomly initialized. Further, the method includes computing a set of initial adversarial samples using the plurality of encoders based, at least in part, on the set of payment transaction samples. Further, the method includes optimizing the plurality of encoders to generate a plurality of evolved encoders. Further, the method includes computing a plurality of fitness scores for the plurality of evolved encoders. Further, the method includes determining a top evolved encoder from the plurality of evolved encoders based, at least in part, on the plurality of fitness scores. Further, the method includes generating a set of final adversarial samples using the top evolved encoder based, at least in part, on the set of payment transaction samples.

In another embodiment, a server system is disclosed. The server system includes a communication interface and a memory including executable instructions. The server system also includes a processor communicably coupled to the memory. The processor is configured to execute the instructions to cause the server system, at least in part, to access a set of payment transaction samples from a transaction database. The server system is further caused to initialize a plurality of encoders, weights of each of the plurality of encoders being randomly initialized. Further, the server system is caused to compute a set of initial adversarial samples using the plurality of encoders based, at least in part, on the set of payment transaction samples. Further, the server system is caused to optimize the plurality of encoders to generate a plurality of evolved encoders. Further, the server system is caused to compute a plurality of fitness scores for the plurality of evolved encoders. Further, the server system is caused to determine a top evolved encoder from the plurality of evolved encoders based, at least in part, on the plurality of fitness scores. Further, the server system is caused to generate a set of final adversarial samples using the top evolved encoder based, at least in part, on the set of payment transaction samples.

In yet another embodiment, a non-transitory computer-readable storage medium is disclosed. The non-transitory computer-readable storage medium includes computer-executable instructions that, when executed by at least a processor of a server system, cause the server system to perform a method. The method includes accessing a set of payment transaction samples from a transaction database. The method includes initializing a plurality of encoders, weights of each of the plurality of encoders being randomly initialized. Further, the method includes computing a set of initial adversarial samples using the plurality of encoders based, at least in part, on the set of payment transaction samples. Further, the method includes optimizing the plurality of encoders to generate a plurality of evolved encoders. Further, the method includes computing a plurality of fitness scores for the plurality of evolved encoders. Further, the method includes determining a top evolved encoder from the plurality of evolved encoders based, at least in part, on the plurality of fitness scores. Further, the method includes generating a set of final adversarial samples using the top evolved encoder based, at least in part, on the set of payment transaction samples

BRIEF DESCRIPTION OF THE FIGURES

For a more complete understanding of example embodiments of the present technology, reference is now made to the following descriptions taken in connection with the accompanying drawings in which:

FIG. 3 is a flow diagram of evolution-based specialized perturbation attack (ESPA) algorithm, in accordance with an embodiment of the present disclosure;

FIGS. 7A and 7B, collectively, illustrate a method for generating adversarial examples using the evolution-based specialized perturbation attack (ESPA) algorithm, in accordance with another embodiment of the present disclosure;

Figure 1:
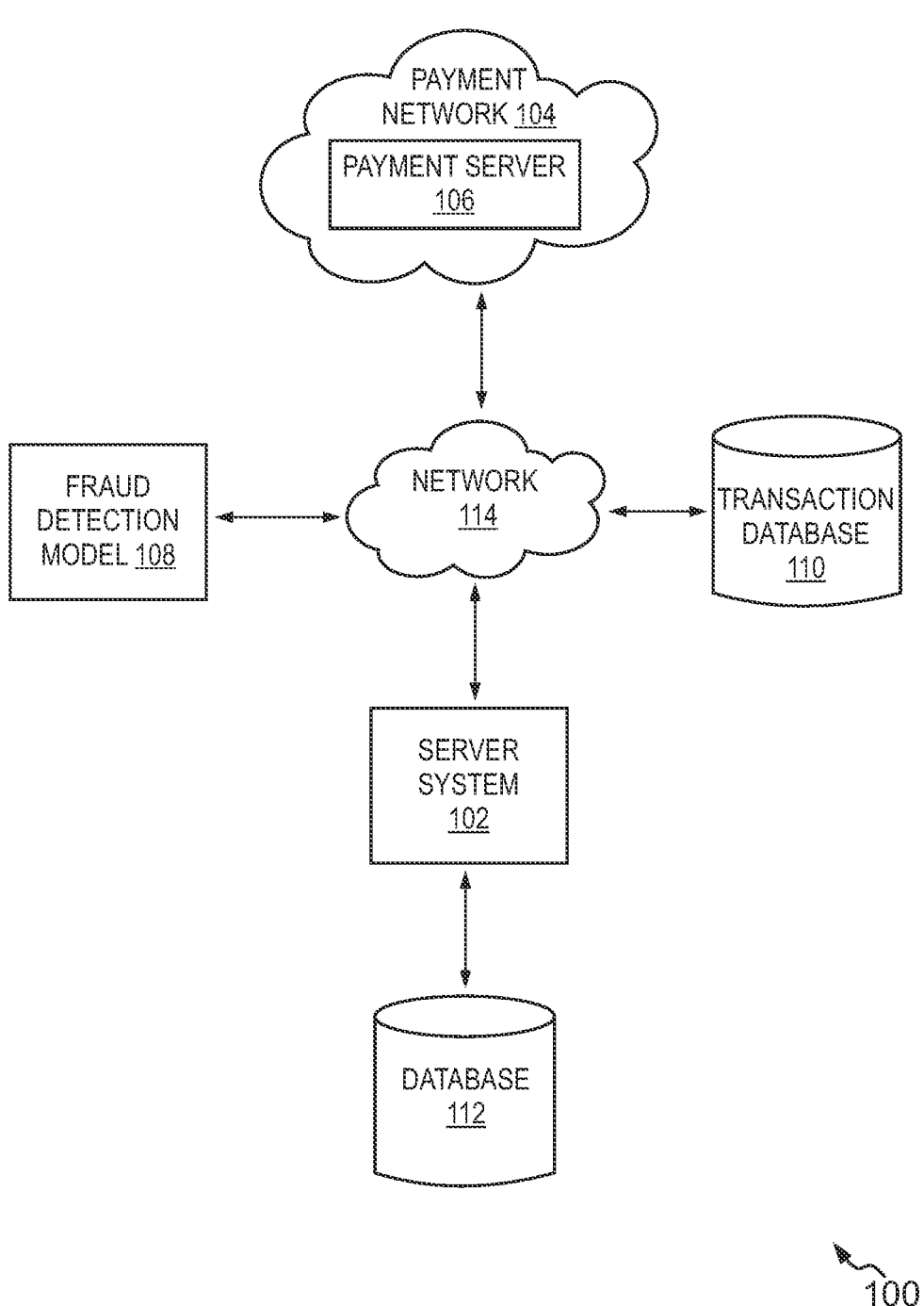
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or conjunction with each other, one skilled in the art will appreciate that many of these features can be provided independently of other features. Accordingly, this description of the present disclosure is set forth without any loss of generality to, and without imposing limitations upon, the present disclosure.

The term "issuer", used throughout the description, refers to a financial institution normally called an "issuer bank" or "issuing bank" in which an individual or an institution may have an account. The issuer also issues a payment card, such as a credit card or a debit card, etc. Further, the issuer may also facilitate online banking services such as electronic money transfer, bill payment, etc., to the account holders through a server system called "issuer server" throughout the description.

The term "payment network", used herein, refers to a network or collection of systems used for the transfer of funds through the use of cash substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes that may include payment cards, letters of credit, checks, financial accounts, etc. Examples of networks or systems configured to perform as payment networks include those operated by such as Mastercard®.

The term "merchant", used throughout the description generally refers to a seller, a retailer, a purchase location, an organization, or any other cardholder that is in the business of selling goods or providing services, and it can refer to either a single business location or a chain of business locations of the same cardholder.

The terms "cardholder" and "customer" are used interchangeably throughout the description and refer to a person who holds a credit or a debit card that will be used by a merchant to perform a card-not-present (CNP) payment transaction.

The term "machine learning model", used throughout the description, may refer to an application of artificial intelligence that provides systems with the ability to automatically learn and improve from experience without explicitly being programmed. A machine learning model may include a set of software routines and parameters that can predict an output of a process (e.g., identification of fraudulent transactions, authentication of a cardholder, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines (SVM), models that classify data by establishing a gap or boundary between inputs of different classifications, as well as neural networks, which are collections of artificial "neurons" that perform functions by activating in response to inputs. In some embodiments, a neural network can include a convolutional neural network, a recurrent neural network, etc.

The term "tabular dataset", used throughout the description, can include a collection of related sets of information that can be composed of different elements represented in tabular form but can be manipulated as a unit by a computer. In some embodiments, a dataset can include a plurality of feature vectors. For example, in some embodiments, the dataset can include publicly available datasets for credit card fraud detection systems. It is noted that although various techniques of the present disclosure are explained using payment transaction sample datasets that are tabular datasets, this should not be construed as a limitation of the present disclosure. To that end, other forms of datasets such as image datasets, audio datasets, and the like may also be used to implement the various embodiments of the present disclosure explained later.

Contemporary fraud detection models are very prone to adversarial attacks where fraudsters attempt to fool the fraud detection models in deployment, which can potentially cause huge losses to issuers. In general, adversarial attacks can be divided into two types: (1) white-box attacks, and (2) black-box attacks.

The white-box attacks are those where the attacker has the access to the model that is being attacked and the generation of adversarial attacks is treated as an optimization problem. In white-box attacks, the attacker has access to the architecture of the model and model parameters. Attacks such as the Fast-Gradient Sign Method, Jacobian-based Saliency Map Attacks, DeepFool, Carlini-Wagner attacks are some examples of white-box attacks.

The black-box attacks are performed by the attackers, where the attackers only have access to the outputs of the model. Depending on whether the model uses the output probability or only the label, the black-box attacks are further divided into score-based and decision-based attacks. The arrangement of a black-box attack is very similar to a real-world scenario where the attacker is not involved in the development of the model under attack and the objective of the attacker is to bypass a deployed model by querying and observing the model output. This type of attack represents a realistic picture where the attacker is often constrained in terms of access to the model and another constraint on the attacker is the limited number of queries available to the attacker. Since most APIs have some limit on the number of queries in a particular time period, for an attack to be successful, it must also be query efficient. The attacks like Zeroth-order optimization, HopskipJump, Boundary attack, and GenAttack are originally proposed to create adversarial examples for image datasets.

A detailed study on black-box attack methods for the tabular dataset is performed. In general, the adversarial examples on the tabular data are created by introducing larger perturbations to less important features in the data and small perturbations to the more important features. In one example, the attack algorithm relies on the transferability of adversarial examples, where the attacker generates adversarial examples on a surrogate model to use these against the target model. In another example, a gradient-based approach is studied that requires training a surrogate model which is not very likely possible considering that an attacker usually has very limited resources. In yet another example, the adversarial examples are generated using a gradient-free optimization genetic algorithm and in this algorithm, a population of samples is evolved iteratively while going through the process of selection, crossover, and mutation.

The Zeroth Order Optimization (ZOO) attack builds on the work by C&W™, by modifying the loss function such that it only depends on the output of the deep neural network and performing optimization with gradient estimates obtained via finite differences.

The Boundary Attack is a black-box attack that only requires queries of the output class, not of the logic or output probabilities. The Boundary attack algorithm initializes by taking a random distribution of pixels for an image in the range of [0, 255]. Using this image, the algorithm traverses the decision boundary of the class to which the sample input image belongs to. The initialized image is then able to reduce its distance with respect to the input image besides staying inside the adversarial region.

The HopSkipJump attack method builds upon the Boundary attack and only requires class predictions to produce an attack.

Overview

Various example embodiments of the present disclosure provide artificial intelligence methods, systems, user devices, and computer program products for generating adversarial samples or examples (used interchangeably hereinafter). More specifically, techniques disclosed herein enable a server system to generate a set of adversarial samples that can be used to train or fine-tune any fraud detection model. The fraud detection model may be used by any entity in the payment network to determine whether a payment transaction is fraudulent or non-fraudulent.

Conventional black-box attack techniques which are used to generate adversarial examples are limited in their applicability. This is due to the fact that such attack techniques require a large number of queries to perform a successful attack using adversarial examples.

To overcome such problems or limitations, the present disclosure describes a server system that is configured to generate a set of adversarial samples or examples without performing gradient optimization like the conventional techniques while maintaining a low query count. In an example, the server system is a payment server associated with a payment network.

In one embodiment, the server system is configured to access a set of payment transaction samples from a transaction database. In an example, the set of payment transaction samples is a tabular dataset.

In one embodiment, the server system is configured to initialize a plurality of encoders. The weights of each of the plurality of encoders are randomly initialized. In an example, the plurality of encoders is feed-forward neural network models.

In one embodiment, the server system is configured to compute a set of initial adversarial samples using the plurality of encoders based, at least in part, on the set of payment transaction samples. At first, the server system is configured to determine a plurality of feature vectors based, at least in part, on the set of payment transaction samples. Then, the server is further configured to generate a perturbation in each payment transaction sample of the set of payment transaction samples based, at least in part, on the plurality of feature vectors. The size of the perturbation is adjusted based, at least in part, on a tan H function.

In one embodiment, the server system is further configured to optimize the plurality of encoders to generate a plurality of evolved encoders. This optimization includes iteratively performing the following steps till an improvement in a set of success scores saturates. At first, the server system is configured to compute a set of fitness scores for the plurality of encoders. Each of the set of fitness scores indicates a fitness score for each of the plurality of encoders. Then, the server system is configured to select a subset of encoders from the plurality of encoders based, at least in part, on the set of fitness scores of the subset of encoders being higher than a threshold value. Further, the server system is configured to generate a plurality of evolved encoders based, at least in part, on adding random mutations to the weights of each of the subset of encoders. Further, the server system is configured to compute via a fraud detection model, the set of success scores for the plurality of evolved encoders. In an example, the fraud detection model is a classifier such as a Multi-layer perceptron (MLP) classifier and the like. It is noted that for computing the set of fitness scores the server system is configured to at first compute via the fraud detection model a set of decision scores based, at least in part, on the set of initial adversarial samples. Herein, each of the set of decision scores indicates a probability of a payment transaction being fraudulent. Then, the server system is configured to compute a logarithmic for each of the set of decision scores, the logarithmic indicating a fitness value. Further, the server system is configured to compute an average fitness value for each encoder of the plurality of encoders based, at least in part, on the logarithmic.

In one embodiment, the server system is configured to compute a plurality of fitness scores for the plurality of evolved encoders. The server system is configured to determine a top evolved encoder from the plurality of evolved encoders based, at least in part, on the plurality of fitness scores. Further, the server system is configured to generate a set of final adversarial samples using the top evolved encoder based, at least in part, on the set of payment transaction samples. Furthermore, the server system is configured to fine-tune a fraud detection model based, at least in part, on the set of final adversarial samples.

Various embodiments of the present disclosure offer multiple technical advantages and technical effects. For instance, the present disclosure requires a low query count as the encoder is optimized to generate adversarial transaction data samples instead of each transaction data sample, separately. Further, there is no need to evolve the encoder for every adversarial attack, once a well-performing encoder, i.e., the top evolved encoder is created. Furthermore, the technique provided by the present disclosure instills reusability and easy transferability, as the encoder can be reused and easily transferred.

The technique provided by the present disclosure provides a gradient-free optimization i.e., no gradient estimation is required. In one embodiment, the present approach is considered to be an evolutionary attack model where the model evolves each time the attack takes place (i.e., each time the encoder is optimized during the attack). The present disclosure improves the generation of fraudulent transaction datasets by utilizing an optimized encoder to generate perturbed samples easily and quickly. Further, by finetuning a fraud detection model based on the set of final adversarial samples, the performance of the fraud detection model can be vastly improved, i.e. fraud detection rate can be improved.

Various example embodiments of the present disclosure provide methods, systems, user devices, and computer program products for building robust fraud detection models with adversarial examples generated using the "evolution-based specialized perturbation attack (ESPA)" algorithm. More specifically, techniques disclosed herein disclose generating adversarial examples based on past payment transactions (represented in form of the tabular dataset), with limited resources, similar to what an actual attacker might face. Here, the fraud detection model may be a statistical model, a classification model, and/or a neural network model.

Embodiments described herein change fundamental concepts of fraud detection models by generating possible adversarial examples for successful black-box attacks based on a gradient-free approach to attacking the fraud detection models that evolve to produce specialized perturbations on samples and are very query efficient.

Further, the embodiments are evaluated on performance and benchmarks using two publicly datasets: (1) European card dataset (ECD) and (2) IEEE-CIS fraud data (IEEE).

Various example embodiments of the present disclosure are described hereinafter with reference to FIGS. 1 to 9.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, determining the best fit model that can generate adversarial samples of transaction data, thereby resulting in generating adversarial samples with minor variations in fraud parameters to train a fraud detection model.

The environment 100 generally includes a server system 102, a payment network 104 including a payment server 106, a fraud detection model 108, and a transaction database 110, each coupled to, and in communication with (and/or with access to) a network 114. The network 114 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among two or more of the parts illustrated in FIG. 1, or any combination thereof.

Various entities in the environment 100 may connect to the network 114 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, future communication protocols or any combination thereof. For example, the network 114 may include multiple different networks, such as a private network made accessible by the server system 102 and a public network (e.g., the Internet, etc.) through which the server system 102 and the payment server 106 may communicate.

In one embodiment, the server system 102 is configured to create a population of random encoders, i.e., encoders that are initialized randomly, and optimize the population of random encoders to add small perturbations to the transaction data to generate adversarial transaction data samples. It is noted that the term 'encoders' and 'random encoders' are used interchangeably hereinafter. The adversarial transaction data samples are in the form of tabular data and are used in an evolution-based algorithm to train the population of random encoders. In one embodiment, the server system 102 is configured to calculate the fitness of each encoder of the population of random encoders and choose the encoders with the highest fitness values.

The server system 102 is a separate part of the environment 100, and may operate apart from (but still in communication with, for example, via the network 114) the payment server 106 and any third-party external servers (to access data to perform the various operations described herein). However, in other embodiments, the server system 102 may be incorporated, in whole or in part, into one or more parts of the environment 100, for example, the payment server 106. In addition, the server system 102 should be understood to be embodied in at least one computing device in communication with the network 114, which may be specifically configured, via executable instructions, to perform steps as described herein, and/or embodied in at least one non-transitory computer-readable media. In one embodiment, the server system 102 includes a database 112 which is configured to store the evolution-based specialized perturbation attack (ESPA) algorithm.

The fraud detection model 108 is a machine learning model which detects fraudulent transactions in a given set of transactions. The fraud detection model 108 detects the fraud and raises an alert to the issuer or the payment server 106 that the transaction is fraudulent. In an example, the fraud detection model 108 may represent a classification. In one embodiment, the fraud detection model 108 detects adversarial transaction sample data and raises an alert or a flag to an issuer stating the transaction is fraudulent transaction. In another embodiment, fraud detection model 108 represents a surrogate fraud detection model derived from a fraud detection model associated with an issuer server (explained later in reference with FIG. 8). The fraud detection model 108 is used by the issuer server to prevent any fraudulent transaction from being authorized.

In one embodiment, the transaction database 110 is a central repository of data that is created by storing a set of payment transaction samples from transactions occurring within acquirers and issuers associated with the payment network 104. The transaction database 110 stores real-time payment transaction sample data of a plurality of merchants. The payment transaction data may include, but is not limited to, payment transaction attributes, such as transaction identifier, merchant name, merchant identifier, merchant category code (MCC), cross-border transaction flag, payment card type (debit/credit/prepaid), card product type, transaction channel (such as e-commerce, recurring), card-not-present (CNP) transaction flag, response code flag (approve/decline), decline reason code (in case of the declined transaction). In one embodiment, the transaction database 110 may store the payment transaction data in a tabular form.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
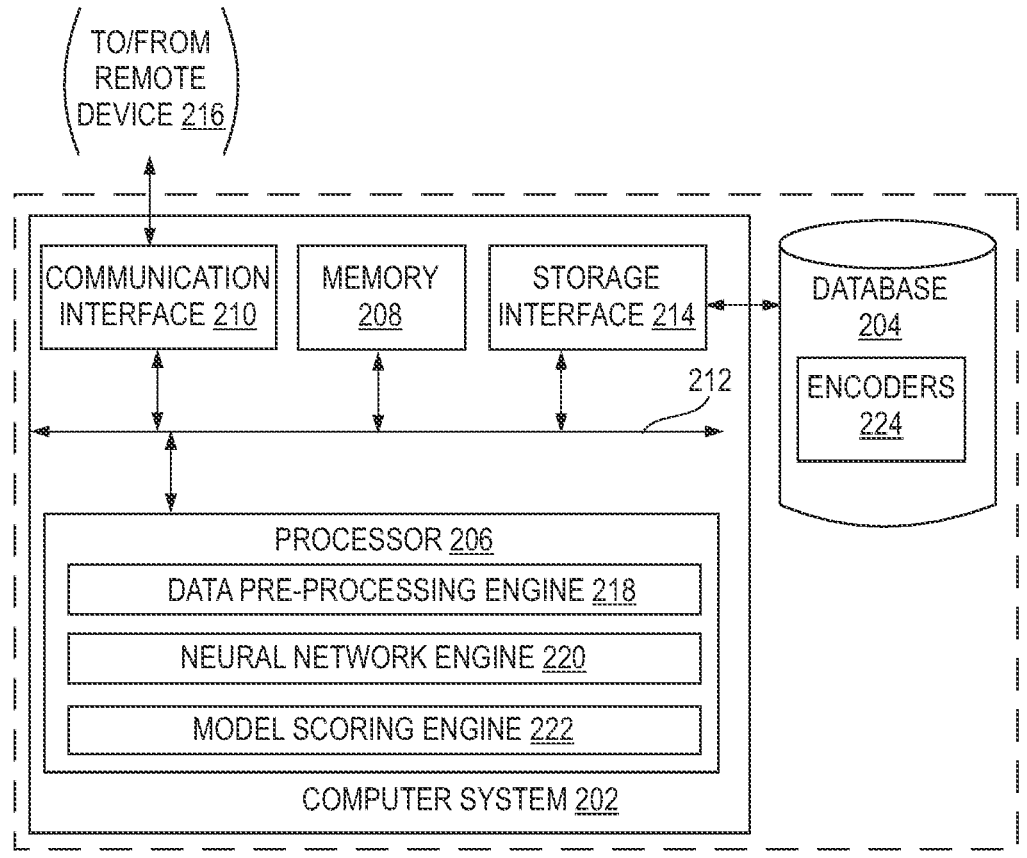
FIG. 2 is a simplified block diagram of a server system, in accordance with one embodiment of the present disclosure.

FIG. 2 is a simplified block diagram of a server system 200, in accordance with an embodiment of the present disclosure. The server system 200 is similar to the server system 102. In some embodiments, the server system 200 is embodied as a cloud-based and/or SaaS-based (software as a service) architecture. In one embodiment, the server system 200 is a part of the payment network 104. In one embodiment, the server system 200 is configured to simulate black-box attacks on the fraud detection models such as the fraud detection model 108 and fine-tune the fraud detection model 180 so that the black-box attacks can be mitigated in the future. In particular, the server system 200 is configured to generate a set of final adversarial samples/examples corresponding to a set of payment transaction samples based on a gradient-free approach that evolves to produce specialized perturbations on samples.

The server system 200 includes a computer system 202 and a database 204. The computer system 202 includes at least one processor 206 for executing instructions, a memory 208, a communication interface 210, and a storage interface 214 that communicate with each other via a bus 212.

In some embodiments, the database 204 is integrated within the computer system 202. For example, the computer system 202 may include one or more hard disk drives as the database 204. The storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204. The database 204 is configured to store encoders 224 which generate adversarial examples by adding perturbations to input transaction samples.

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

The processor 206 is operatively coupled to the communication interface 210 such that the processor 206 is capable of communicating with a remote device 216 such as the fraud detection model 108. It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a data pre-processing engine 218, a neural network engine 220, and a model scoring engine 222. It should be noted that the components, described herein, can be configured in a variety of ways, including electronic circuitries, digital arithmetic and logic blocks, and memory systems in combination with software, firmware, and embedded technologies.

The data pre-processing engine 218 includes suitable logic and/or interfaces for receiving or accessing the set of payment transaction samples from the transaction database 110 and converting the set of payment transaction samples into tabular form. The payment transaction samples are associated with a plurality of cardholders for a particular time window (e.g., 1 year) that are already labeled as fraudulent or non-fraudulent transactions. The data pre-processing engine 218 is configured to determine a plurality of feature vectors based, at least in part, on the set of payment transaction samples, i.e., feature vectors are determined based at least on the cardholder spending behaviors, payment behavior, and cardholder credit bureau information (for example, credit score).

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, the payment transaction data may include transaction features, such as transaction amount, fraud label, timestamp of the payment transaction, etc. Further, a feature vector can be normalized, i.e., be made to have a unit magnitude. As an example, the feature vector ($200, "fraud") corresponding to payment transactions could be normalized to approximately (0.40, 1).

The data pre-processing engine 218 is configured to extract payment transaction features from various data points of the payment transaction data. The payment transaction features may include but are not limited to, transaction details, merchant details, and authentication details. The transaction details may further include details regarding, but are not limited to, transaction amount, card on file, recurring payment, cross border indicator, product type, etc. The merchant details may further include details regarding, but are not limited to, merchant country, currency conversion, merchant category code (MCC), etc.

Thus, the data pre-processing engine 218 is configured to form transaction samples based on the payment transaction data.

The neural network engine 220 includes suitable logic and/or interfaces for generating or initializing a plurality of encoders that takes the transaction samples as inputs and give out specialized perturbations (i.e., adversarial examples) for the transaction samples. In one example, the plurality of encoders may be feed-forward neural network models. Thus, the present disclosure creates a plurality of encoders that generates a set of initial adversarial samples using the plurality of encoders based, at least in part, on the set of payment transaction samples instead of creating the adversarial examples for each fraud transaction sample.

The neural network engine 220 utilizes the plurality of encoders at an iteration and optimizes the plurality of encoders to generate the plurality of evolve encoders. Further, a top evolved encoder from the plurality of evolved encoders is determined based, at least in part, on the plurality of fitness scores calculate for the plurality of evolved encoders. Further, the top evolved encoder is used to generate a set of final adversarial samples based, at least in part, on the set of payment transaction samples. These perturbations are weighted by a vector that effectively decides the average normalized value of perturbation and the importance of each feature vector of the transaction sample or example.

The model scoring engine 222 includes suitable logic and/or interfaces for calculating the fitness of each of the plurality of encoders and the plurality of evolved encoders. The model scoring engine 222 uses the set of initial adversarial samples generated by the plurality of encoder as an input to the fraud detection model 180 to generate a set of decision scores. Then, a mathematical log function is used for each of the set of decision scores to calculate the log value of the adversarial sample, i.e., calculate the fitness value. Further, an average fitness value for each encoder of the plurality of encoders based, at least in part, on the log value.

As used herein and also in connection with genetic algorithms, the term "fitness value" refers to an objective function for evaluating a solution produced by a genetic algorithm in terms of one or more factors, such as precision and coverage of the solution. Herein, the fitness of the encoder is calculated at each evolutionary cycle and an average fitness is determined using the following formulas:

$$\text{fitness} \leftarrow \text{fitness} + \log(f(x^*_j)) \qquad \text{Eqn. (1)}$$

$$\text{fitness} \leftarrow \text{fitness}/n \qquad \text{Eqn. (2)}$$

FIG. 3 is a flow diagram 300 of the evolution-based specialized perturbation attack (ESPA) algorithm, in accordance with an embodiment of the present disclosure. The sequence of operations of the flow diagram 300 may not be necessarily executed in the same order as they are presented. Further, one or more operations may be grouped and performed in form of a single step, or one operation may have several sub-steps that may be performed in parallel or a sequential manner.

At 302, the server system 200 accesses a plurality of payment transactions that are labeled as fraudulent from the transaction database 110. The server system 200 is configured to form a transaction sample (i.e., vector representation of transaction features) corresponding to each payment transaction.

At 304, the server system 200 initializes model parameters of an encoder of a plurality of encoders. In particular, the server system 200 is configured to randomly initialize the weights of each encoder.

At 306, the server system 200 inputs the transaction samples into the plurality of encoders. Each encoder provides an output (i.e., adversarial example) with specialized perturbations for each transaction sample. These perturbations are weighted by a vector that effectively devices the average norm of perturbation and the importance of each feature vector of the transaction sample.

At 308, the server system 200 calculates a fitness value of each encoder of the plurality of encoders. To calculate the fitness of an encoder, the server system 200 is configured to sample a transaction sample and add perturbations from the encoder by passing the transaction sample through the encoder. Thereafter, the server system 200 is configured to pass the output of the encoder to a classifier to get decision scores, and finally logarithmic is calculated. The server system 200 is configured to perform an average fitness value over n transaction samples to have a statistically better prediction. The fitness value is defined as a function that takes a candidate solution to a problem as input and produces as output how "fit" or how "good" the solution is with respect to the problem in consideration. The fitness of each encoder is calculated each time in the evolutionary cycle and an average fitness is calculated for each encoder of the plurality of encoders.

Thereafter, the server system 200 optimizes the plurality of encoders in an evolutionary manner by following steps 310-314 such that adversarial examples with small perturbations can be generated.

At 310, the server system 200 ranks the plurality of encoders according to fitness values of the plurality of encoders.

At 312, the server system 200 then selects a set of the plurality of encoders with fitness values greater than a threshold value. In a non-limiting example, the threshold is determined such that the number of queries is kept low.

At 314, the server system 200 generates a plurality of evolved encoders by creating random mutations according to corresponding weights of the set of the plurality of encoders. The weights of each encoder with high fitness values are altered in every evolutionary cycle to generate the plurality of evolved encoders. In other words, the server system 200 performs mutation of the parameters of the encoder to maintain diversity and encourage state-space exploration. The entire cycle is repeated for a particular number of iterations.

At 316, the server system 200 generates adversarial examples using a final set of evolved encoders after completing all the iterations.

In one example, a pseudo-code of the ESPA algorithm is as follows:

---

Input: A set X of input examples, population size p, mutation rate ρ, elite members e, samples per fitness n, classifier f, feature importance vector v.
Output: An encoder from the last generation, with the highest fitness.
Initialize A population P of encoders ($\varphi_i$, with randomly initialized weights $\theta_i$.
for generation g=1 to G do
  for i = 1, ..., p in P do
    fitness = 0
    for j = 1, ..., n do
      $x_f \sim U(X)$
      $x_f^* \leftarrow x_f + v \cdot \tanh(\varphi i(x_f))$
      fitness ← fitness + log(f($x_f^*$))
    fitness ← fitness/n
  Create a new population from top e elite members.
  Mutate the population according to rate ρ.

---

Figure 4:
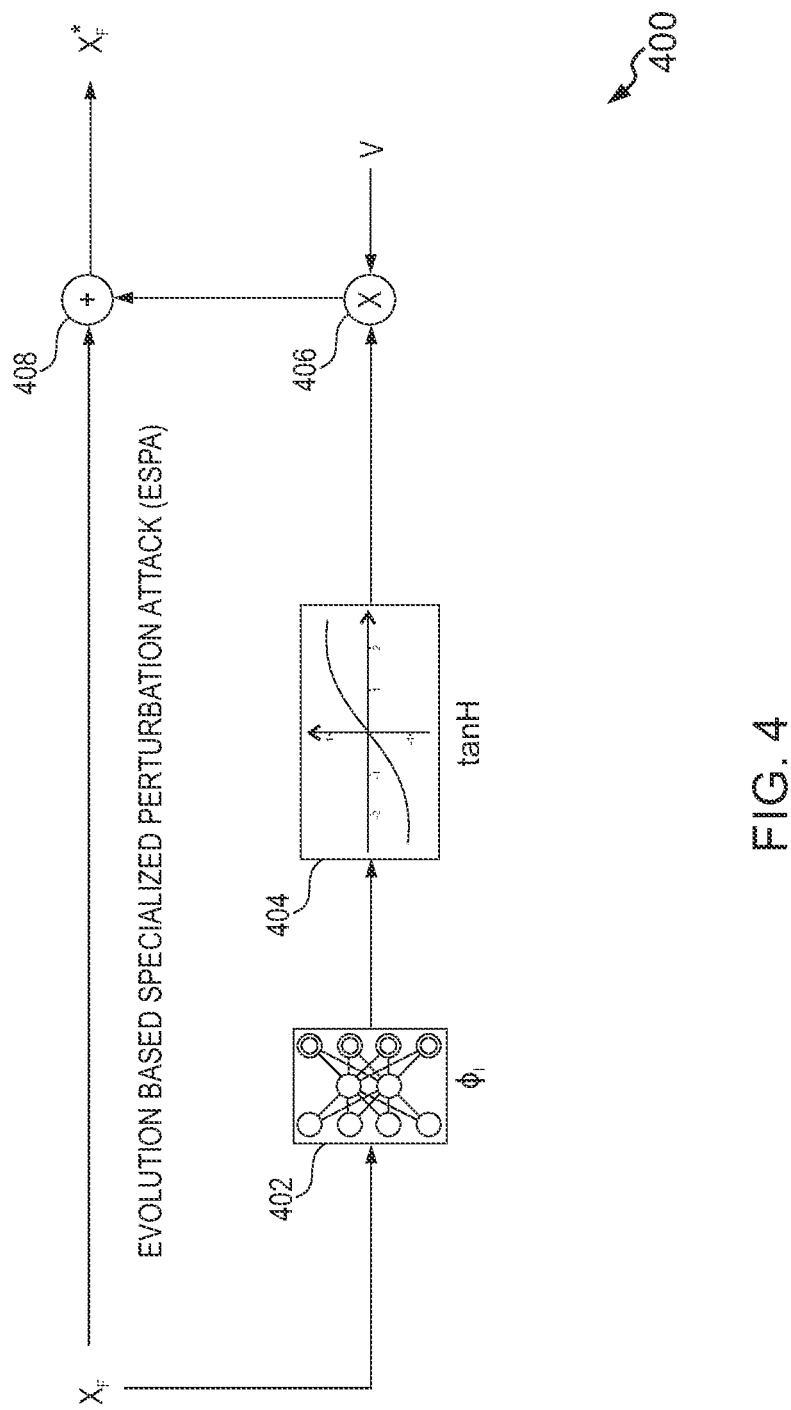
FIG. 4 is a schematic block diagram representation of evolution-based specialized perturbation attack (ESPA) algorithm, in accordance with an embodiment of the present disclosure.

Referring now to FIG. 4, a schematic block diagram representation 400 of evolution-based specialized perturbation attack (ESPA) algorithm, is shown, in accordance with an embodiment of the present disclosure. The proposed architecture enables the generation of adversarial transaction data samples using an optimized encoder. In one example, the encoder is a simple linear model.

An encoder 402 inputs a transaction data sample $X_f$ from a plurality of transaction samples from the transaction database 110. In one embodiment, the transaction sample $X_f$ is sent through the encoder 402 where the encoder 402 adds a very small noise or perturbation into the transaction sample $X_f$. The perturbation added to the transaction data sample $X_f$ is very small in order to keep the characteristics of the perturbed sample small in comparison with the actual transaction data sample $X_f$.

A 'tan H' function 404 is a trigonometric function that is used in the ESPA algorithm in order to keep the value of generated perturbed sample small. To that end, a size of the perturbation is adjusted based, at least in part, on a Tan H function (i.e., the 'tan H' function 404) ensures that the output value of the encoder 402 or the perturbed transaction data sample is kept within the value −1 to 1. In one embodiment, the 'tan H' function 404 converts all the outputs of the encoder to be within the range of −1 to 1.

At operator 406, a feature importance vector v, i.e., a feature vector that is multiplied into the output of the 'tan H' function 404 to generate a feature importance perturbed transaction sample that upholds the feature importance.

$$x_f \sim U(X) \qquad \text{Eqn. (3)}$$

$$x_f^* \leftarrow x_f + v \cdot \tan h(\varphi i(x_f)) \qquad \text{Eqn. (4)}$$

At operator 408, the perturbed transaction data sample which upholds the feature importance is added to the actual transaction data sample to generate a sample $x_f^*$. In one embodiment, the fitness of an encoder is calculated by adding the fitness value to the log of $x_f^*$.

In one embodiment, the above model requires a low query count as the encoder is optimized to generate adversarial transaction data samples instead of each transaction data sample, separately. Further, there is no need to evolve the encoder 402 for every adversarial attack, once a well-performing encoder, i.e., the top evolved encoder is created.

Furthermore, the ESPA algorithm instills reusability and easy transferability, as the top evolved encoder can be reused and easily transferred.

In an example embodiment, the above algorithm is evaluated on tabular transaction datasets of global Card-Not-Present customer transactions. A single transaction data sample is taken from the tabular transaction dataset. The single transaction data sample is input into the ESPA algorithm to generate a feature-oriented perturbed transaction data sample which is used to fool the fraud detection model 108 similar to a black-box attack. The ESPA algorithm generates the feature-oriented perturbed transaction data sample by adding noise to the transaction data sample and then retaining the value within −1 to 1 using a 'tan H' function and further adding the feature importance vector 'v' to the perturbed sample which is then added with the actual transaction data sample to generate the perturbed fraud data sample. In one embodiment, the evolution-based specialized perturbation attack (ESPA) method is focused on generating fraudulent transaction datasets to train the fraud detection model 108 to determine vulnerabilities and fraudulent transactions. The ESPA is a type of black-box attack which tries to attack and fool the fraud transaction model to loot money. The evolution-based specialized perturbation attack (ESPA) is a type of black-box attack, where the attacks only have access to the outputs of the model using which the model is attacked. In the ESPA algorithm, instead of generating a population of adversarial examples by randomly introducing perturbations in the transaction data sample, a population of the plurality of encoders is generated. The ESPA algorithm provides a gradient-free optimization i.e., no gradient estimation is required. In one embodiment, the ESPA algorithm is considered to be an evolutionary attack model where the model evolves each time the attack takes place (i.e., each time the encoder is optimized during the attack). The present disclosure improves the generation of fraudulent transaction datasets by utilizing an optimized encoder to generate perturbed samples easily and quickly.

Figure 5:
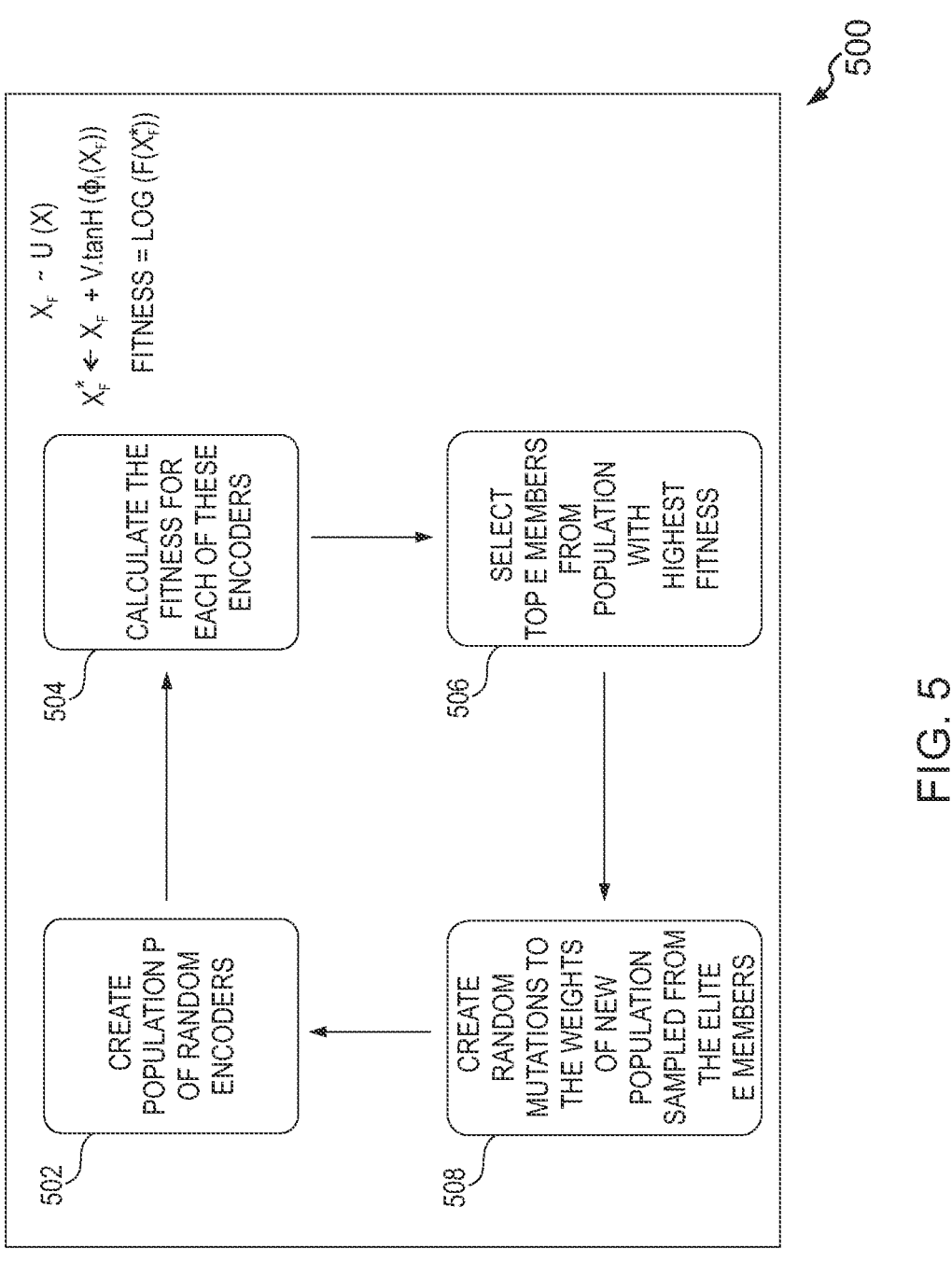
FIG. 5 is a schematic block diagram representation of the ESPA algorithm for optimizing a plurality of encoders to generate adversarial samples.

FIG. 5 is a schematic block diagram representation 500 of the ESPA algorithm for optimizing a plurality of encoders to generate adversarial samples, in accordance with an embodiment of the present disclosure. FIG. 5 depicts a method of adding perturbations to sample transaction data to generate adversarial transaction data samples. The method includes 4 cyclic steps of optimizing the encoders 224 to add perturbations to the data samples to generate adversarial data samples which are performed cyclically till the encoders 224 can generate perfect adversarial transactions data samples.

Step 502 involves the creation of a population 'P' of a plurality of random encoders for optimizing them to generate adversarial transaction data samples. In one embodiment, the population of random encoders is depicted using 'P' and the random encoders are depicted using 'φ'.

Step 504 involves calculating the fitness for each of the encoders of the plurality of random encoders. In one embodiment, the fitness of an encoder is calculated by sampling a transaction data sample $x_f$ from a set X and passing it through a classifier to get decision scores.

Step 506 involves selecting the top few encoders 'E' from the population of a plurality of encoders with the highest fitness values. It is noted that top few encoders are depicted using 'E'. The plurality of encoders with the highest fitness values is the encoders that can optimize and generate the adversarial transaction data samples by perturbing them.

Step 508 involves creating random mutations to the weights of the new population of the plurality of encoders with the highest fitness values. The selected encoders from the population of the plurality of encoders are optimized by creating random mutations to the weights of each encoder of the plurality of encoders to generate adversarial transaction data samples.

It should be noted that for comparing the performance of models, Recall, precision, and F1 scores are used due to the highly imbalanced class. However, for attacks on credit card fraud detection models, the false-negative counts should be as low as possible, especially for high transaction amounts. Therefore, for benchmarking purposes, the Recall and F2 scores of all the models are plotted.

The recall rate is defined as $t_p/(t_p+f_n)$, where $t_p$ and $f_n$ are the true positives and the false negatives respectively. F2 score is derived from the general F-beta score ($F_\beta$), and is defined as:

$$F_\beta = \frac{\left(1 + \beta^2\right) * \text{Precision} * \text{Recall}}{\beta^2 * (\text{Precision}) + (\text{Recall})} \qquad \text{Eqn. (5)}$$

where $\beta$ is 2 for the F2 score. The Fbeta-measure is the weighted harmonic mean of precision and recalls where a beta value 1 means more weightage to recall.

It should be noted that the tabular data has complex cross-feature interactions unlike image data and lots of gradient-based attack methods struggle in such tabular datasets. To understand the effectiveness of the attack strategies, performance metrics such as success ratio, the norm of perturbation, distance to the closest neighbor, number of queries, and mean probabilities are defined.

The success ratio (SR) may be formally defined as the ratio of the number of examples that were able to fool the model, to the total number of examples tested. Hence, if we define $X_f$ as the set of adversarial examples used for attacks, and $X^- f$ as the set which changed the model's prediction, the SR is defined as:

$$SR = \frac{|\overline{X_f}|}{|X_f|} \qquad \text{Eqn. (6)}$$

The norm of perturbation (NP) is given by, for a given example x and its corresponding adversarial example 'x' created by adding perturbations x, then the norm of perturbation is defined as, $$NP = \frac{\Sigma_{x \in \overline{X_f}} \|x - x\prime\|_p}{|\overline{X_f}|} \qquad \text{Eqn. (7)}$$

The distance to the closest neighbor (DCN) is measured as the average of the norm of the difference between the adversarial example and its closest neighbor, taken from the entire dataset. It is defined as, $$DCN = \frac{\Sigma_{x \in \overline{X_f}} d(x_f)}{|\overline{X_f}|} \qquad \text{Eqn. (8)}$$

$$d(x_f) = \min_{x \in X} \|x_f - x\|_2 \qquad \text{Eqn. (9)}$$

The number of queries is measured by keeping the total number of adversarial examples to produce as constant.

Ideally, a good attack strategy uses the least number of queries to produce a successful attack.

The mean probabilities metric tries to identify and highlight the adversaries which produce a larger deflection in the probability score of the model. The Mean Probability of only those attacks which were successful (MPSA) and Mean Probability of all Attacks (MPAA) are measured and the probabilities with which the model determines that the adversarial samples are not fraudulent is also taken into account. Hence, a good attack method will be able to produce high values for both MPSA and MPAA.

Experiments:

The present disclosure also provides a detailed study of different techniques used for generating adversarial samples using a transaction dataset.

A. Datasets and Pre-Processing:

The present disclosure considers two open datasets that contain both fraud and non-fraud credit card transactions are used. The two open datasets are European card datasets and the IEEE-CIS fraud data datasets. The European card dataset contains 284,807 transactions spanning over a few days and out of these transactions, 492 transactions (i.e., 0.172%) are labeled as fraud. The data contains 31 features out of which 28 features are the result of PCA transformation and the other three features are time (i.e., seconds elapsed since the first transaction in data), amount of the transaction, and the fraud label.

The IEEE-CIS fraud data is real-world e-commerce transaction data with numerical and some categorical features and is available on Kaggle. The dataset contains 590,540 credit card transactions where 20,663 are fraud transactions. For preprocessing steps, the data using a min-max scaler and then taking the top 50 PCA components for the IEEE data are normalized and further training, validation, and test ratio of 7:1:2 is used for both the datasets.

B. Model Benchmarks:

The present disclosure also provides a detailed study of different techniques or models that can be used in generating adversarial samples. The present disclosure uses four different models or classifiers such as Logistic Regression classifier, Decision Tree classifier, Random Forest classifier, and Multi-layer Perceptron (MLP) classifier. The most common machine learning models are compared by training each of them on the fraud detection problem, on the European card dataset and IEEE-CIS fraud data dataset, and a dataset performing the best in terms of F2 score value is identified. Further, instead of using the conventional 0.5 thresholds for identifying the fraud samples, a custom threshold for each of the models is used. This particular conventional 0.5 threshold is chosen by the dataset which produced the highest F2 score value for the validation set across the entire range of threshold values (0, 1).

TABLE I

| Classifier | Recall | Precision | F2 |
|---|---|---|---|
| Logistic Regression | 80% | 81% | 81% |
| Decision Tree Classifier | 73% | 87% | 75% |
| Random Forest Classifier | 82% | 80% | 82% |
| MLP Classifier | 82% | 86% | 83% |

TABLE II

| Classifier | Recall | Precision | F2 |
|---|---|---|---|
| Logistic Regression | 50% | 23% | 40% |
| Decision Tree Classifier | 51% | 32% | 46% |

TABLE II-continued

| Classifier | Recall | Precision | F2 |
|---|---|---|---|
| Random Forest Classifier | 60% | 48% | 58% |
| MLP Classifier | 63% | 50% | 60% |

The tables I and II show recall and F2 scores on the 4 different types of models or classifiers for the European and IEEE datasets, respectively. Each model is trained on the best hyper-parameters sampled from a cross-validated grid-search over a parameter grid. The best-performing tree-based approaches had a max depth value of 16 and using a total of 50 estimators gave the best performance for the Random Forest classifier. Further, for the MLP classifier, using a single hidden layer with 200 hidden nodes also gave the best performance.

For experimenting with tabular data attacks, the most common black-box attacks on the MLP classifier are evaluated. The MLP classifier performs the best on the F2 score for both datasets.

Further, the following tables III and IV show the performance of the proposed ESPA approach against the state-of-the-art black-box adversarial methods for the European and IEEE datasets, respectively. In one embodiment, the number of adversarial samples for the European dataset is much less than IEEE. Therefore, to create adversarial attacks for each of these adversarial samples, methods like Zeroth Order Optimization (ZOO), HopSkipJump (HSJ), and Boundary attack need to query the model for every new sample.

TABLE III

| | NP | DCN | MPSA | MPAA |
|---|---|---|---|---|
| Zoo Attack | 1.32 | 1.32 | 0.67 | 0.33 |
| HopSkipJump | 2.03 | 2.03 | 0.85 | 0.73 |
| Boundary Attack | 7.05 | 6.93 | 0.79 | 0.70 |
| ESPA | 4.57 | 4.56 | 0.97 | 0.85 |

TABLE IV

| | NP | DCN | MPSA | MPAA |
|---|---|---|---|---|
| Zoo Attack | 0.46 | 0.46 | 0.73 | 0.42 |
| HopSkipJump | 0.23 | 0.20 | 0.81 | 0.54 |
| Boundary Attack | 5.93 | 5.92 | 0.98 | 0.52 |
| ESPA | 0.92 | 0.92 | 0.999 | 0.80 |

The ESPA algorithm needs to sample from a distribution of examples to evaluate the fitness and since it optimizes an encoder instead of directly adding perturbations to the example, once a well-performing encoder is optimized, it can directly create an adversarial example without the user querying the model. Hence, for both the datasets, the number of queries remains the same for genetic datasets in the proposed approach, but for other approaches, the queries increase proportionally with the data size. Therefore, if the number of adversarial examples is f, then for any type of conventional black-box attack, the total number of queries Q is defined as:

$$Q = f \cdot \psi(x_f) \qquad \text{Eqn. (10)}$$

Where the function $\psi$ is specific to each attack method and defines the number of queries required to create a single adversarial example. Table V shows a comparison between success ratio and the number of queries used for the European card dataset using the different models. Table VI shows a comparison success ratio and the number of queries used for the IEEE card dataset using the different models.

TABLE V

| | SR | Number of Queries |
|---|---|---|
| Zoo Attack | 60% | 11022 |
| HopSkipJump | 82% | 20054 |
| Boundary Attack | 84% | 4414 |
| ESPA | 86% | 15000 |

TABLE VI

| | SR | Number of Queries |
|---|---|---|
| Zoo Attack | 39% | 390584 |
| HopSkipJump | 52% | 870759 |
| Boundary Attack | 52% | 160723 |
| ESPA | 63% | 30000 |

For example, the function $\psi$ for the GenAttack algorithm is G(f)·P, where G(f) is the number of generations for which example f is evolved, and P is the population size. Therefore, for the GenAttack algorithm, the total number of queries is:

$$Q = f \cdot G(f) \cdot P \qquad \text{Eqn. (11)}$$

However, for the case of the proposed ESPA method, the number of queries Q is a constant:

$$Q = n \cdot G \cdot P \qquad \text{Eqn. (12)}$$

Where G and P denote generations and population size respectively, and n denotes the samples taken to calculate the average fitness for each encoder. In all the experiments, the value of n is =5 which gives sufficiently good results. For the European credit card dataset, G=3 while for IEEE, G=6, while keeping the population size P=1000. Comparing the above two equations, it is noted that the complexity of conventional attacks in terms of the number of samples is O(f), whereas for ESPA algorithm, the complexity is O(1). This result helps in explaining the effectiveness of the proposed approach on large targeted attacks. Hence, the genetic approach performs well on the tabular datasets compared to the other SOTA black-box methods. This raises the suspicion that the data distribution of the adversarial examples from the genetic approach might be far from the true labels.

Tables IV and VI show how well the attacks perform with respect to norms and mean probability. Our method ESPA performs well in terms of both MPAA and MPSA for both datasets, which is expected considering the fact that it utilizes the information from previously successful attacks to better deceive the model. For the IEEE dataset (Table VI), the average norm values for ESPA are below 1 which is considered acceptable for most cases. For the European dataset (Table IV), the norm values are high, but they are still lower than those of the Boundary attack.

Figure 6A:
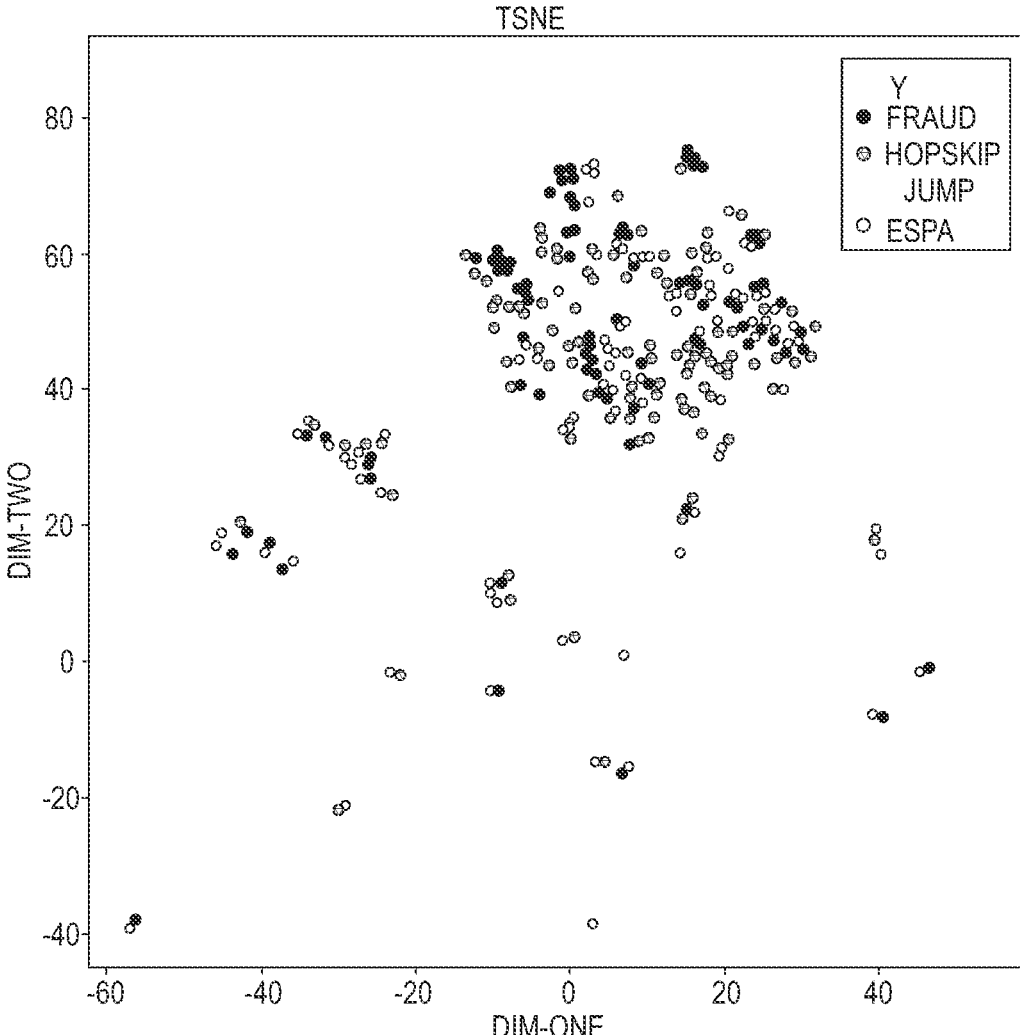
FIGS. 6A and 6B depict t-SNE plots for the European dataset and IEEE dataset comparing adversarial data samples to actual data samples for multiple black-box attack models.
Figure 6B:
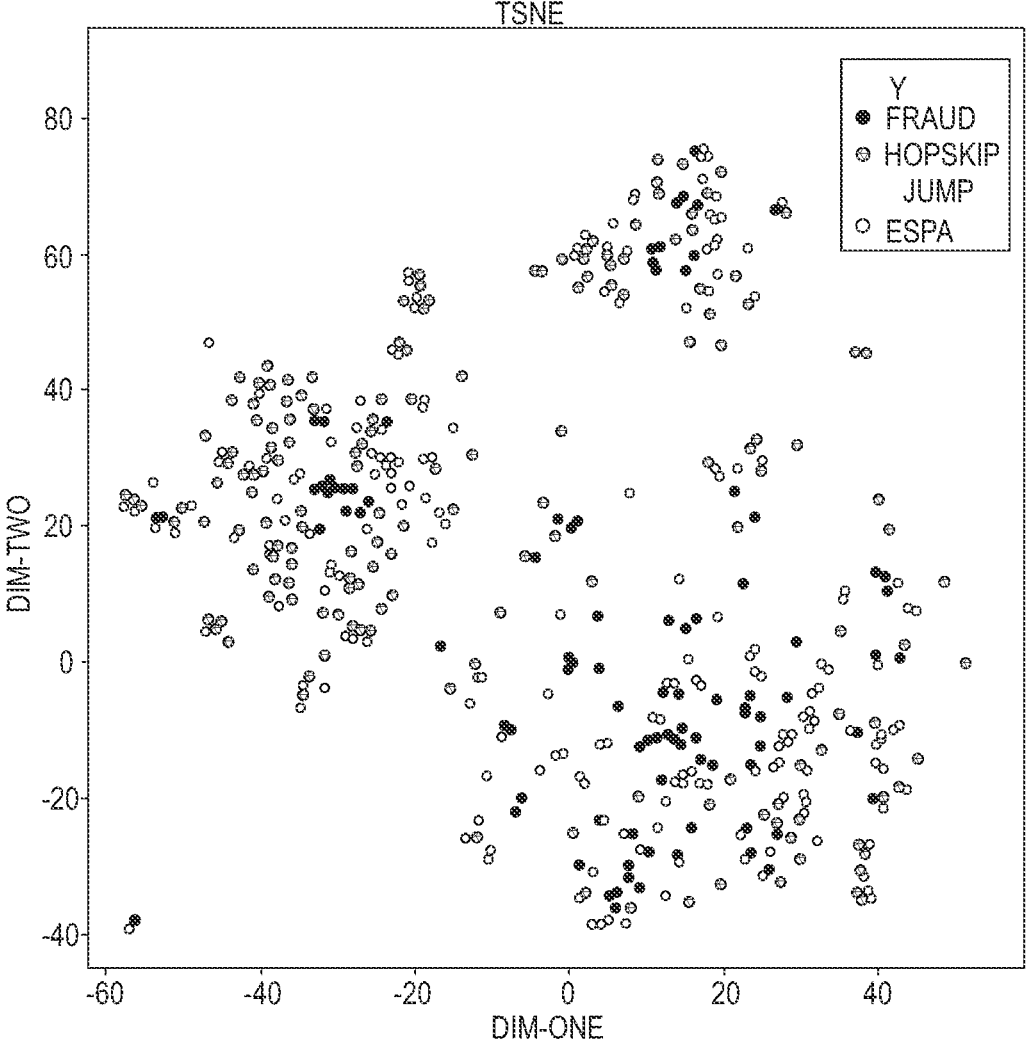

FIGS. 6A and 6B depict t-SNE plots for the European dataset and IEEE dataset comparing adversarial data points to actual data samples for multiple black-box attack models. FIG. 6A shows a graph 600 that includes t-SNE plot for the European transaction dataset and FIG. 6B shows a graph 620 that includes t-SNE plot for the IEEE transaction dataset. The graphs plots show multiple data which include adversarial data samples, HSJ data samples, and evolution-based perturbation attack (ESPA) data samples. The graph only shows those adversaries which were successful in their attack and it's seen that the adversaries lie close to the actual fraud samples. Apart from this, it is observed that the ESPA algorithm can produce adversarial examples in the vicinity of some fraud examples which are not reachable by the HSJ algorithm. This emphasizes the importance of specialized attacks for certain examples in order to create a diverse set of adversaries.

Figure 7B:
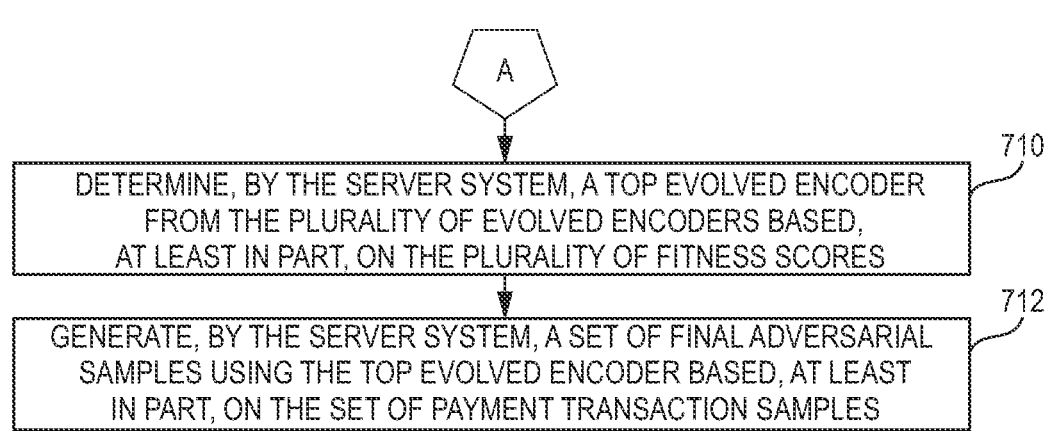

FIGS. 7A-7B, collectively, illustrate a method 700 for generating adversarial examples using the evolution-based specialized perturbation attack (ESPA) algorithm, in accordance with another embodiment of the present disclosure. The sequence of operations of the method 700 may not be necessarily executed in the same order as they are presented. Further, one or more operations may be grouped and performed in form of a single step, or one operation may have several sub-steps that may be performed in parallel or a sequential manner.

At 702, the method 700 includes accessing, by a server system, a set of payment transaction samples from a transaction database.

At 704, the method 700 includes initializing, by the server system, a plurality of encoders, the weights of each of the plurality of encoders being randomly initialized.

At 706, the method 700 includes computing a set of initial adversarial samples using the plurality of encoders based, at least in part, on the set of payment transaction samples.

At 708, the method 700 includes optimizing, by the server system, the set of encoders to generate a plurality of evolved encoders. It is noted that optimizing the plurality of encoders includes iteratively performing the following steps (708a-708d) till an improvement in a set of success scores saturates, the steps including:

At 708a, the method 700 includes computing, by the server system, a set of fitness scores for the plurality of encoders, each of the set of fitness scores indicating fitness score for each of the plurality of encoders.

At 708b, the method 700 includes selecting, by the server system, a subset of encoders from the plurality of encoders based, at least in part, on the set of fitness scores of the subset of encoders being higher than a threshold value.

At 708c, the method 700 includes generating, by the server system, a plurality of evolved encoders based, at least in part, on adding random mutations to the weights of each of the subset of encoders.

At 708d, the method 700 includes computing via a fraud detection model, by the server system, the set of success scores for the plurality of evolved encoders.

At 710, the method 700 includes determining, by the server system, a top evolved encoder from the plurality of evolved encoders based, at least in part, on the plurality of fitness scores.

At 712, the method 700 includes generating, by the server system, a set of final adversarial samples using the top evolved encoder based, at least in part, on the set of payment transaction samples.

Figure 8:
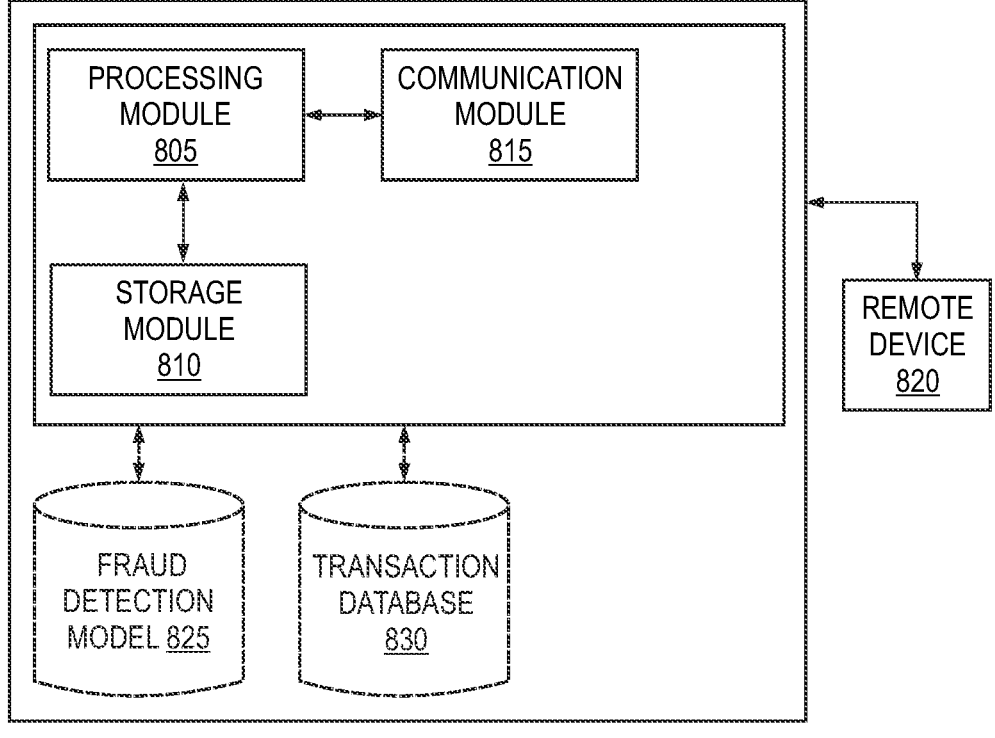
FIG. 8 is a simplified block diagram of an issuer server, in accordance with one embodiment of the present disclosure.

FIG. 8 is a simplified block diagram of an issuer server 800, in accordance with one embodiment of the present disclosure. The issuer server 800 is associated with an issuer bank/issuer, in which a cardholder may have an account. The issuer being a financial institution normally called an "issuer bank" or "issuing bank" in which an individual or an institution may have an account. The issuer also issues a payment card, such as a credit card or a debit card, etc. The issuer server 800 includes a processing module 805 communicably coupled to a storage module 810 and a communication module 815. The components of the issuer server 800 provided herein may not be exhaustive, and the issuer server 800 may include more or fewer components than those depicted in FIG. 8. Further, two or more components may be embodied in one single component, and/or one component may be configured using multiple sub-components to achieve the desired functionalities. Some components of the issuer server 800 may be configured using hardware elements, software elements, firmware elements, and/or a combination thereof.

The storage module 810 includes information associated with the cardholder, such as, but not limited to, a primary account number (PAN one or more parameters), a name, a city, a postal code, and the like.

Via the communication module 815, the processing module 805 may receive information from a remote device 820 such as the server system 102, and the payment server 106. In an embodiment, the processing module 805 may communicate the information related to the payment transaction a fraud detection model 825. The fraud detection model being a machine learning model which detects fraudulent transactions in a given set of transactions stored in or accessed from a transaction database 830. The fraud detection model 108 detects the fraud and raises an alert to the payment server 106 that the transaction is fraudulent. Upon detection of the fraudulent transaction, the transaction request is declined. It is noted that the fraud detection model 825 as described in FIG. 8 is identical to the fraud detection model 108 of FIG. 1. Further, the transaction database 830 is a repository of data that is created by storing a set of payment transaction samples from transactions occurring within the payment network 104. The transaction database 110 stores real-time payment transaction sample data of a plurality of merchants. The payment transaction data may include, but is not limited to, payment transaction attributes, such as transaction identifier, merchant name, merchant identifier, merchant category code (MCC), cross-border transaction flag, payment card type (debit/credit/prepaid), card product type, transaction channel (such as e-commerce, recurring), card-not-present (CNP) transaction flag, response code flag (approve/decline), decline reason code (in case of the declined transaction). It is noted that the transaction database 830 as described in FIG. 8 is identical to the transaction database 110 of FIG. 1.

Figure 9:
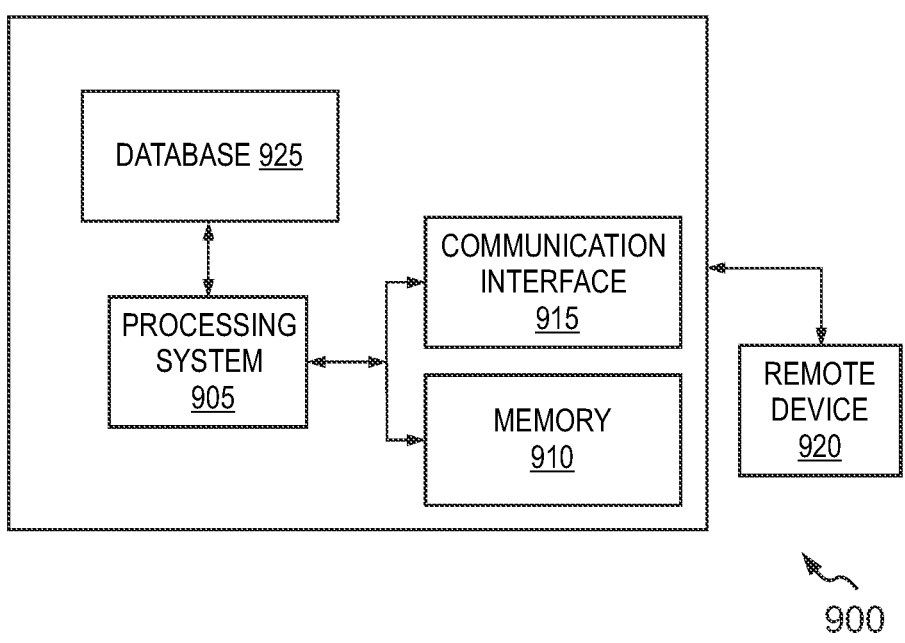
FIG. 9 is a simplified block diagram of a payment server, in accordance with an embodiment of the present disclosure.

FIG. 9 is a simplified block diagram of a payment server 900, in accordance with an embodiment of the present disclosure. The payment server 900 is an example of the payment server 106 of FIG. 1. A payment network may be used by the payment server 900 as a payment interchange network. Examples of payment interchange network include, but not limited to, Mastercard® payment system interchange network. The payment server 900 includes a processing system 905 configured to extract programming instructions from a memory 910 to provide various features of the present disclosure. Further, two or more components may be embodied in one single component, and/or one component may be configured using multiple sub-components to achieve the desired functionalities. Some components of the payment server 900 may be configured using hardware elements, software elements, firmware elements and/or a combination thereof.

In one embodiment, the payment server 900 is configured to determine future server failures based on server logs processed within a particular time window. Via a communication interface 915, the processing system 905 receives information from a remote device 920 such as one or more databases. The processing system 905 is operatively coupled to the communication interface 915 such that the payment server 900 is capable of communicating with the remote device 920 or of communicating with any entity connected to the network 114 (shown in FIG. 1) or any constituents of the server system 102. The payment server 900 may also include a database 925 to store transaction history of the plurality of cardholders.

The method 700 disclosed in the FIG. 7 and the one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, netbook, Webbook, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal-oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method comprising:

accessing, by a server system configured for generation of adversarial samples for machine learning model training on tabular data, tabular dataset samples;

initializing, by the server system, a plurality of encoders, wherein weights of each of the plurality of encoders are randomly initialized;

computing, by the server system, a set of initial adversarial samples using the plurality of encoders based, at least in part, on the tabular dataset samples, wherein the set of initial adversarial samples simulates perturbations in the tabular dataset samples;

generating, by the server system, a plurality of evolved encoders based, at least in part, on adjusting the weights of the plurality of encoders based on feedback from a fitness scoring function;

computing, by the server system, a plurality of fitness scores for the plurality of evolved encoders;

selecting, by the server system, a top-performing evolved encoder of the plurality of evolved encoders based on the plurality of fitness scores; and generating, by the server system, a set of final adversarial samples using the top-performing evolved encoder based, at least in part, on the tabular dataset samples, wherein the set of final adversarial samples is used to train a machine learning model.

2. The method of claim 1, wherein computing the set of initial adversarial samples, further comprises:

determining, by the server system, a plurality of feature vectors based, at least in part, on the tabular dataset samples; and generating, by the server system, a perturbation in each tabular dataset sample of the tabular dataset samples based, at least in part, on the plurality of feature vectors.

3. The method of claim 2, wherein a size of the perturbation is adjusted based, at least in part, on a tan H function.

4. The method of claim 1, wherein optimizing the plurality of encoders further comprises iteratively performing steps based on the plurality of fitness scores until a set of success scores saturates improves above a predetermined threshold, the steps comprising:

computing, by the server system, a set of fitness scores for the plurality of encoders, each of the set of fitness scores indicating a fitness score for each of the plurality of encoders;

selecting, by the server system, a subset of encoders from the plurality of encoders based, at least in part, on the set of fitness scores of the subset of encoders being higher than a threshold value;

generating, by the server system, a plurality of evolved encoders based, at least in part, on adding random mutations to the weights of each of the subset of encoders; and computing via the machine learning model, by the server system, the set of success scores for the plurality of evolved encoders.

5. The method of claim 4, wherein computing the set of fitness scores, further comprises:

computing via the machine learning model, by the server system, a set of decision scores, based, at least in part, on the set of initial adversarial samples, each of the set of decision scores indicating a probability of a payment transaction being fraudulent;

computing, by the server system, a logarithmic metric for each of the set of decision scores, the logarithmic metric indicating a fitness value; and computing, by the server system, an average fitness value for each encoder of the plurality of encoders based, at least in part, on the logarithmic metric.

6. The method of claim 1, further comprising:

tuning, by the server system, the machine learning model based, at least in part, on the set of final adversarial samples.

7. The method of claim 1, wherein the plurality of encoders comprises feed-forward neural network models.

8. The method of claim 1, wherein the server system is a payment server associated with a payment network.

9. A server system configured for generation of adversarial samples for machine learning model training on tabular data, comprising:

a communication interface;

a memory comprising executable instructions; and a processor communicably coupled to the communication interface and the memory, the processor configured to execute the instructions to cause the server system, at least in part, to:

access tabular dataset samples;

initialize a plurality of encoders, wherein weights of each of the plurality of encoders are randomly initialized;

compute a set of initial adversarial samples using the plurality of encoders based, at least in part, on the tabular dataset samples, wherein the set of initial adversarial samples simulates perturbations in the tabular dataset samples;

generate a plurality of evolved encoders based, at least in part, on adjusting the weights of the plurality of encoders based on feedback from a fitness scoring function;

compute a plurality of fitness scores for the plurality of evolved encoders;

select a top-performing evolved encoder of the plurality of evolved encoders based on the plurality of fitness scores; and generate a set of final adversarial samples using the top-performing evolved encoder based, at least in part, on the tabular dataset samples, wherein the set of final adversarial samples is used to train a machine learning model.

10. The server system of claim 9, wherein computing the set of initial adversarial samples further causes the server system, at least in part, to:

determine a plurality of feature vectors based, at least in part, on the tabular dataset samples; and generate a perturbation in each tabular dataset sample of the tabular dataset samples based, at least in part, on the plurality of feature vectors.

11. The server system of claim 10, wherein a size of the perturbation is adjusted based, at least in part, on a tan H function.

12. The server system of claim 9, wherein the instructions to cause the server system to optimize the plurality of encoders further causes the server system, at least in part, to iteratively perform steps based on the plurality of fitness scores until a set of success scores saturates improves above a predetermined threshold, the steps comprising:

compute a set of fitness scores for the plurality of encoders, each of the set of fitness scores indicating a fitness score for each of the plurality of encoders;

select a subset of encoders from the plurality of encoders based, at least in part, on the set of fitness scores of the subset of encoders being higher than a threshold value;

generate a plurality of evolved encoders based, at least in part, on adding random mutations to the weights of each of the subset of encoders; and compute via the machine learning model the set of success scores for the plurality of evolved encoders.

13. The server system of claim 12, wherein computing the set of fitness scores, further causes the server system, at least in part, to:

compute via the machine learning model, a set of decision scores based, at least in part, on the set of initial adversarial samples, each of the set of decision scores indicating a probability of a payment transaction being fraudulent;

compute a logarithmic metric for each of the set of decision scores, the logarithmic metric indicating a fitness value; and compute an average fitness value for each encoder of the plurality of encoders based, at least in part, on the logarithmic metric.

14. The server system of claim 9, wherein the server system is further caused, at least in part, to:

tune the machine learning model based, at least in part, on the set of final adversarial samples.

15. The server system of claim 9, wherein the plurality of encoders is feed-forward neural network models.

16. A non-transitory computer-readable storage medium comprising computer-executable instructions that, when executed by at least a processor of a server system, cause the server system to perform a method for generation of adversarial samples for machine learning model training on tabular data, the method comprising:

accessing tabular dataset samples;

initializing a plurality of encoders, wherein weights of each of the plurality of encoders are randomly initialized;

computing a set of initial adversarial samples using the plurality of encoders based, at least in part, on the tabular dataset samples, wherein the set of initial adversarial samples simulates perturbations in the tabular dataset samples;

generating a plurality of evolved encoders, based, at least in part, on adjusting the weights of the plurality of encoders based on feedback from a fitness scoring function;

computing a plurality of fitness scores for the plurality of evolved encoders;

selecting, by the server system, a top-performing evolved encoder of the plurality of evolved encoders based on the plurality of fitness scores; and generating a set of final adversarial samples using the top-performing evolved encoder based, at least in part, on the tabular dataset samples, wherein the set of final adversarial samples is used to train a machine learning model.

17. The non-transitory computer-readable storage medium as claimed in claim 16, wherein computing the set of initial adversarial samples, further comprises:

determining a plurality of feature vectors based, at least in part, on the tabular dataset samples; and generating a perturbation in each tabular dataset sample of the tabular dataset of samples based, at least in part, on the plurality of feature vectors, wherein a size of the perturbation is adjusted based, at least in part, on a tan H function.

18. The non-transitory computer-readable storage medium as claimed in claim 16, wherein optimizing the plurality of encoders further comprises iteratively performing steps based on the plurality of fitness scores until a set of success scores saturates improves above a predetermined threshold, the steps comprising:

computing a set of fitness scores for the plurality of encoders, each of the set of fitness scores indicating a fitness score for each of the plurality of encoders;

selecting a subset of encoders from the plurality of encoders based, at least in part, on the set of fitness scores of the subset of encoders being higher than a threshold value;

generating a plurality of evolved encoders based, at least in part, on adding random mutations to the weights of each of the subset of encoders; and computing via the machine learning model, the set of success scores for the plurality of evolved encoders.

\* \* \* \* \*